United States Patent
Ko et al.

(10) Patent No.: US 10,192,367 B2
(45) Date of Patent: Jan. 29, 2019

(54) VEHICLE BODY FLAW ELIMINATION METHOD USING VIRTUAL MARK AND SYSTEM THEREOF

(71) Applicants: HYUNDAI MOTOR COMPANY, Seoul (KR); KIA MOTORS CORPORATION, Seoul (KR)

(72) Inventors: Young Wan Ko, Seoul (KR); Man Ki Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 73 days.

(21) Appl. No.: 15/620,370

(22) Filed: Jun. 12, 2017

(65) Prior Publication Data

US 2018/0154962 A1   Jun. 7, 2018

(30) Foreign Application Priority Data

Dec. 6, 2016   (KR) .................. 10-2016-0165277

(51) Int. Cl.
 *G06T 19/20* (2011.01)
 *G06F 3/01* (2006.01)
 *B62D 65/00* (2006.01)
 *G06T 7/00* (2017.01)

(52) U.S. Cl.
 CPC .............. *G06T 19/20* (2013.01); *G06F 3/017* (2013.01); *B62D 65/005* (2013.01); *G05B 2219/32014* (2013.01); *G06T 7/0004* (2013.01)

(58) Field of Classification Search
 CPC ....... B62D 65/005; G06F 3/017; G06T 15/20; G06T 19/20; G06T 7/0004
 See application file for complete search history.

(56) References Cited

U.S. PATENT DOCUMENTS

| 8,094,120 | B2 | 1/2012 | Ratai |
| 2007/0173265 | A1 | 7/2007 | Gum |
| 2014/0250412 | A1 | 9/2014 | Vogelmeier et al. |

FOREIGN PATENT DOCUMENTS

| JP | 2003-338700 A | 11/2003 |
| JP | 2004-279233 A | 10/2004 |
| KR | 10-1509695 B1 | 4/2015 |

*Primary Examiner* — Maurice L. McDowell, Jr.
(74) *Attorney, Agent, or Firm* — McDermott Will & Emery LLP

(57) ABSTRACT

A vehicle body flaw elimination method using a virtual mark, includes: detecting, by a robotic visioner, a flaw formed on a vehicle body surface and outputting corresponding flaw data; forming, by a controller, a virtual marker corresponding to the flaw data on a 3D model corresponding to the vehicle body; transmitting, by the controller, data of the 3D model on which the virtual marker is formed to a wearable device; and detecting, by the controller, a position of the vehicle body and a position of the wearable device to identify the position of the vehicle body and a position of a worker wearing the wearable device, and modifying the 3D model of the wearable device in a direction in which the worker views the vehicle body.

17 Claims, 8 Drawing Sheets ical Field

VEHICLE BODY FLAW ELIMINATION METHOD USING VIRTUAL MARK AND SYSTEM THEREOF

CROSS-REFERENCE TO RELATED APPLICATION

This application is based on and claims the benefit of priority to Korean Patent Application No. 10-2016-0165277 filed on Dec. 6, 2016 with the Korean Intellectual Property Office, the disclosure of which is incorporated herein in its entirety by reference.

TECHNICAL FIELD

The present disclosure relates to a vehicle body flaw elimination method using a virtual mark and a system thereof that may mark a position and type of a flaw formed on a surface of a vehicle body by using a virtual mark on a 3D model such that a worker can detect the flaw through the marked position and type of the flaw and then eliminate the flaw.

BACKGROUND

An outer surface of a vehicle body should not be formed with flaws such as unevenness, bending, cracking, scratches, or the like. Generally, an appearance inspection of the vehicle body has been dependent on naked eyes of a worker.

However, since the appearance inspection by the naked eyes of the worker depends on a worker's determination criterion for quality and a worker's working method, it is difficult to accurately inspect the flaw in the appearance inspection of the vehicle body; thus reliability of the appearance inspection may deteriorate, and uniform quality management of the vehicle body may be difficult to achieve.

Recently, in order to improve an appearance quality of a vehicle, an appearance quality inspection has been performed through a vehicle body metal finishing process and a coating quality inspection. The detected flaws therethrough are repaired.

The appearance quality inspection of the vehicle is mainly performed by manual work or a robotic visioner, and when the appearance quality inspection of the vehicle is performed by the manual work, inspection accuracy and consistency may be degraded.

Further, when the appearance quality inspection of the vehicle is performed by the robotic visioner, cost may increase and productivity may deteriorate since a marking process using a separate robotic visioner for marking a flaw position is added so that the worker can find the flaw position of the vehicle body.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a vehicle body flaw elimination method using a virtual mark and a system thereof that may reduce cost and improve productivity by omitting a robot marking process for detecting a flaw position and forming a mark on a vehicle body corresponding to the flaw position in a vehicle body appearance quality inspection process.

An exemplary embodiment of the present disclosure provides a vehicle body flaw elimination method using a virtual mark, including: detecting, by a robotic visioner, a flaw formed on a vehicle body surface and outputting corresponding flaw data; forming, by a controller, a virtual marker corresponding to the flaw data on a 3D model corresponding to the vehicle body; transmitting, by the controller, data of the 3D model on which the virtual marker is formed to a wearable device; and detecting, by the controller, a position of the vehicle body and a position of the wearable device to identify the position of the vehicle body and a position of a worker wearing the wearable device, and modifying the 3D model transmitted to the wearable device in a direction in which the worker views the vehicle body.

The flaw data may include position information detected by the robotic visioner and a flaw characteristic.

The vehicle body flaw elimination method using the virtual mark may further include: detecting, by the controller, a position of a work tool configured to eliminate the flaw; and selecting, by the controller, the flaw to be repaired according to the position of the wearable device and the position of the work tool.

The vehicle body flaw elimination method using the virtual mark may further include: detecting, by the controller, a gesture of the worker; and determining, by the controller, whether the flaw is eliminated based on the detected gesture.

The vehicle body flaw elimination method using the virtual mark may further include eliminating, by the controller, the virtual marker from the data of the 3D model when the flaw is determined to be eliminated.

each position of the wearable device, the vehicle body, or the work tool may be detected through a relative position between a reference beacon arranged on a predetermined position in a work space and a moving beacon disposed on the wearable device, the vehicle body, or the work tool.

The vehicle body flaw elimination method using the virtual mark may further include: detecting or receiving, by the controller, specification information of the vehicle body; and selecting, by the controller, the 3D model according to the specification information.

The wearable device may be a smart glass.

Another embodiment of the present disclosure provides a vehicle body flaw elimination method using a virtual mark, including: inputting, through an input device, flaw data; forming, by a controller, a virtual marker corresponding to the flaw data on a 3D model corresponding to a vehicle body; transmitting, by the controller, data of the 3D model on which the virtual marker is formed to a wearable device; and detecting, by the controller, a position of the vehicle body and a position of the wearable device to identify the position of the vehicle body and a position of a worker wearing the wearable device, and modifying the 3D model transmitted to the wearable device in a direction in which the worker views the vehicle body.

The flaw data may include a position and type of the flaw.

The vehicle body flaw elimination method using the virtual mark may further include selecting, by the controller, a working method according to the type of the flaw, and transmitting the working method to the wearable device.

The wearable device may be a smart glass.

Yet another embodiment of the present disclosure provides a vehicle body flaw elimination system using a virtual mark, including: a robotic visioner configured to detect a flaw formed on an outer surface of an vehicle; a position detector configured to detect a position of a wearable device used by a worker based on the vehicle; and a controller configured to form a virtual marker at a position corresponding to the flaw detected by the robotic visioner among 3D data corresponding to the vehicle and to transmit the virtual marker combined with the 3D data corresponding to the position of the wearable device based on a vehicle body of the vehicle to the wearable device.

The position detector may detect a position of a work tool eliminating the virtual marker, and the controller may identify the position of the worker through the position of the wearable device, and may select a work tool to eliminate the virtual marker corresponding to the position of the worker to display it on a screen of the wearable device.

The wearable device may include a camera configured to detect a gesture of the worker, and the controller may determine whether to eliminate the virtual marker through the gesture recognized by the camera and may delete the corresponding virtual marker from the 3D data when it is determined to eliminate the virtual marker.

The wearable device may be a smart glass.

The position detector may include fixed beacons arranged at predetermined intervals on an upper portion of the vehicle and a moving beacon disposed on the vehicle, the wearable device, or the work tool, wherein a corresponding position may be detected according to a relative position between a fixed beacon and the moving beacon.

According to the embodiment of the present disclosure, by combining a 3D model technology with virtual marking technology, it is possible to substantially eliminate a marking apparatus, thereby reducing costs.

In addition, by informing a flaw position based on worker's eyes, it is possible to improve inspection work efficiency and productivity.

Further, by forming a virtual mark on a 3D model of a vehicle body through a robotic visioner and by integrally managing data associated with the virtual mark, it is possible to integrate working data using a computer.

Moreover, by managing working data with a computer and by providing a score for completion of work so as to be able to perform flaw eliminating work of a surface of a vehicle body like a game, it is possible to improve work efficiency.

DETAILED DESCRIPTION

Figure 1:
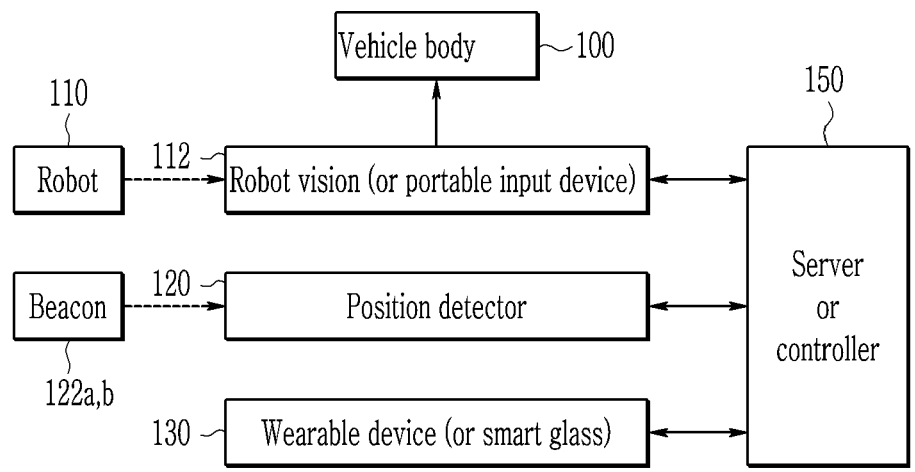
FIG. 1 illustrates a block diagram of a vehicle body flaw elimination system using a virtual mark according to an exemplary embodiment of the present disclosure.

Hereinafter, an exemplary embodiment of the present disclosure will be described in detail with reference to the accompanying drawings.

However, the size and thickness of each component illustrated in the drawings are arbitrarily shown for ease of description and the present invention is not limited thereto, and the thicknesses of portions and regions are exaggerated for clarity.

In addition, parts that are irrelevant to the description are omitted to clearly describe the exemplary embodiments of the present disclosure, and like reference numerals designate like elements throughout the specification.

In the following description, dividing names of components into first, second, and the like is to divide the names because the names of the components are the same, and an order thereof is not particularly limited.

FIG. 1 illustrates a block diagram of a vehicle body flaw elimination system using a virtual mark according to an exemplary embodiment of the present disclosure.

Referring to FIG. 1, a vehicle body flaw elimination system may include a vehicle body 100, a robotic visioner 112, a position detector 120, a wearable device 130, a controller 150, and a work tool 210 (FIG. 2) used by a worker.

The robotic visioner 112 moves along a shape of a vehicle body by a robot 110 to detect a flaw formed on a surface of the vehicle body 100, and it inputs flaw data corresponding to the detected flaw to the controller 150. Here, the flaw data includes a position and a characteristic of the flaw.

The robotic visioner 112 may include a vision sensor or camera for detecting the flaw formed on the surface of the vehicle body 100. Alternatively, instead of using the robotic visioner 112, a worker may input the position and the characteristic of the flaw formed on the surface of the vehicle body 100 through a portable input device, which may include a tablet PC.

The position detector 120 may detect positions of the vehicle body 100, the work tool 210, and the wearable device 130. The position detector 120 may include a beacon, and since a function and a structure of the beacon are well known in the art, a detailed description thereof will be omitted.

The controller 150 forms a virtual marker on a 3D model corresponding to the vehicle body 100 using the flaw data inputted from the robotic visioner 112 or the portable input device.

Then, the 3D model with the virtual marker is transmitted to the wearable device 130. The worker identifies the position of the flaw formed on the 3D model from an image of the 3D model transmitted to the wearable device 130, and eliminates the flaw formed on the actual vehicle body with the work tool 210.

The worker 200 performs a gesture indicating that the flaw has been eliminated, and the camera mounted on the wearable device 130 detects the gesture of the worker corresponding to work completion to transmit it to the controller 150. Then, the controller 150 eliminates the flaw mark formed on the 3D model.

In addition, the position detector 120 detects a position of the wearable device 130 to identify a position of the worker 200 based on the actual vehicle, and transmits the identified position of the worker 200 to the controller 150, and the controller 150, by changing positions of the 3D model and the virtual marker displayed on the screen of the wearable device 130 according to the position of the worker 200, allows the worker to find an actual flaw formed on the vehicle.

The controller 150 may be implemented by one or more processors operated by a predetermined program, and the predetermined program may include a series of commands for performing a method according to an exemplary embodiment of the present disclosure described later.

Figure 2:
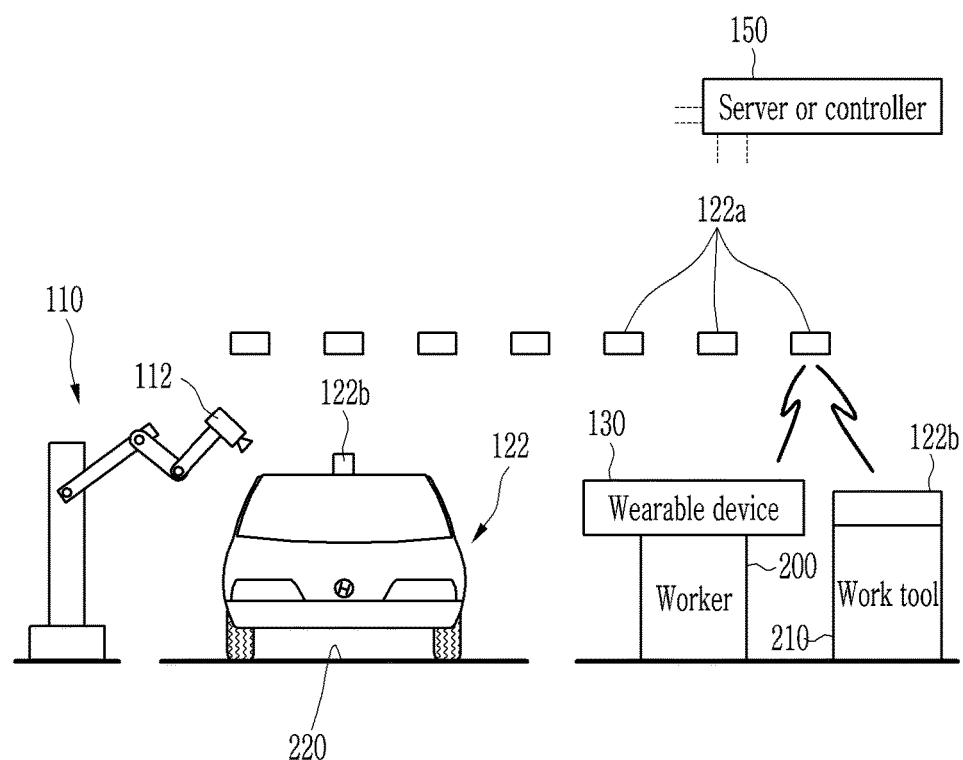
FIG. 2 illustrates a schematic diagram of a vehicle body flaw elimination system using a virtual mark according to an exemplary embodiment of the present disclosure.

FIG. 2 illustrates a schematic diagram of a vehicle body flaw elimination system using a virtual mark according to an exemplary embodiment of the present disclosure.

Referring to FIG. 2, a vehicle body flaw elimination system using a virtual mark includes the robot 110, the robotic visioner 112, a conveyor 220, the vehicle body 100, the wearable device 130, the work tool 210, the beacon 122, and the controller 150.

The vehicle body 100 moves by the conveyor 220, and specification information of the vehicle body is inputted to the controller 150.

The specification information of the vehicle body may be inputted to the controller 150 through the robotic visioner 112, by the worker 200, or through a predetermined program.

The robotic visioner 112 mounted on the robot 110 detects the appearance of the vehicle body 100 and a flaw formed on the vehicle body 100, and the robotic visioner 112 transmits a position and characteristic of the flaw to the controller 150.

Alternatively, the flaw formed on the vehicle body 100 may be identified by the eyes of the worker, the position and characteristic of the flaw may be inputted to a portable input device (e.g., tablet PC), and the input position and characteristic of the flaw may be transmitted to the controller 150.

The controller 150 marks the position and the characteristic of the received flaw with a virtual marker on the 3D model corresponding to the vehicle body, and the 3D model with the virtual marker is transmitted to the wearable device 130 that the worker wears.

The worker identifies the 3D model with the virtual marker displayed on the wearable device 130 with his own eyes, and then moves to a corresponding position for working.

In this case, fixed beacons 122a are arranged at predetermined intervals on an upper portion of the 3D model, and a moving beacon 122b is disposed on each of the work tool 210 and the vehicle body 100.

The fixed beacons 122a may detect the position of the wearable device 130 and the position of the vehicle body 100 while wirelessly communicating with the wearable device 130.

The controller 150 detects the position of the worker 200 through the position of the wearable device 130, and allows the worker 200 to easily find the virtual marker formed on the vehicle body by modifying a shape of the 3D model according to the detected position of the worker 200.

The fixed beacon 122a detects a position of the moving beacon 122b disposed on the work tool 210, and transmits position information of the work tool 210 corresponding to the position of the moving beacon 122b to the controller 150. The controller 150 detects moving paths of the work tool 210 and the worker 200, thereby determining a progress state of the flaw elimination work.

When it is determined that the worker 200 and the work tool 210 move toward a position of a corresponding flaw and the worker performs a gesture corresponding to completion of the work, the wearable device 130 transmits a signal corresponding to the gesture of the worker 200 to the controller 150, and the controller 150 determines the completion of the work through the gesture of the worker detected by the wearable device 130.

When the controller 150 determines that the flaw elimination is completed through the gesture of the worker, it is possible to eliminate the corresponding virtual marker, and then by sequentially repairing flaws formed on the vehicle body, all the flaw elimination work may be completed.

In an exemplary embodiment of the present disclosure, when the worker moves, a snap view with a 3D drawing and a marker may be displayed on the wearable device 130 worn by the worker, for example, on an eyepiece screen of a smart glass.

Figure 3:
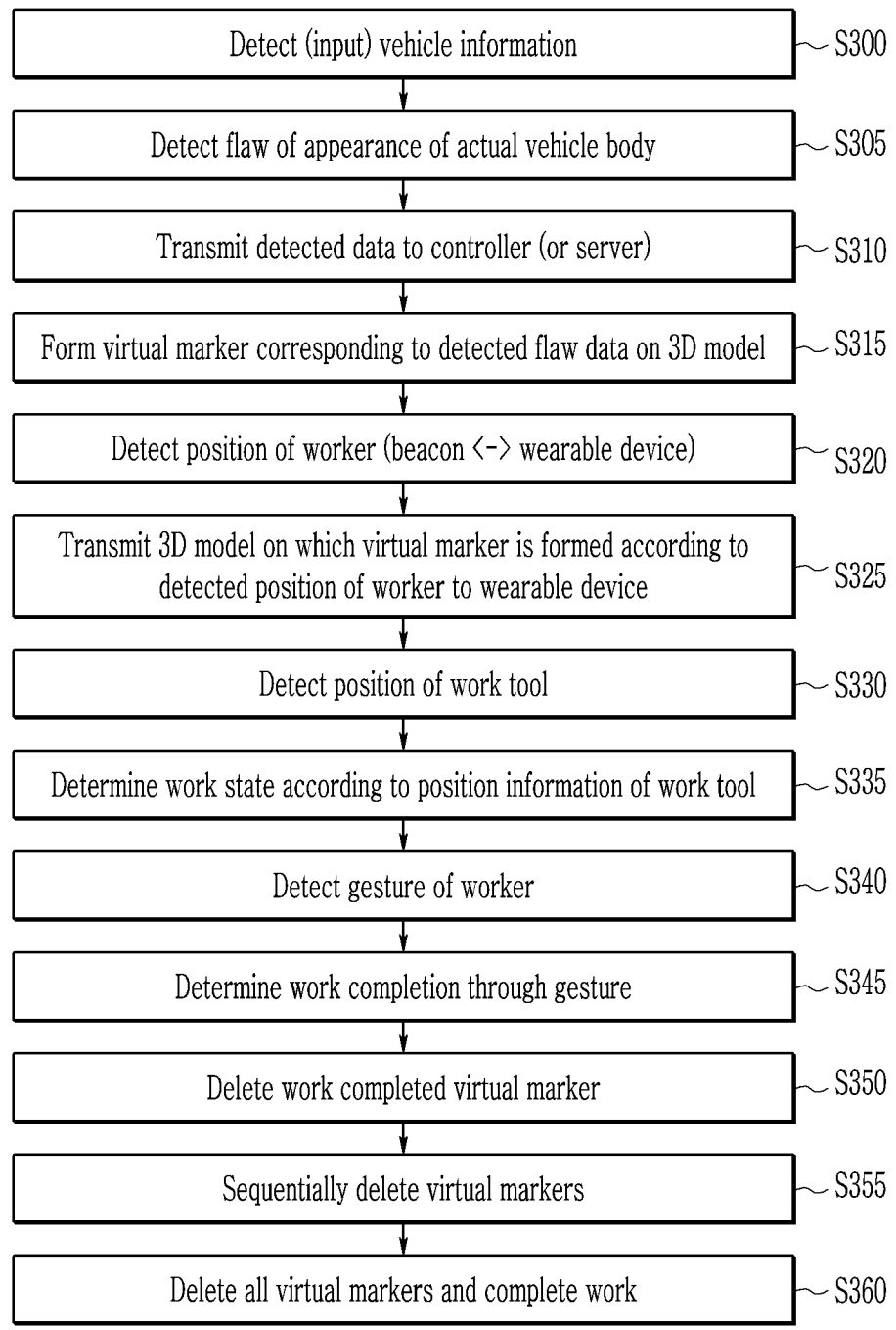
FIG. 3 illustrates a flowchart of a vehicle body flaw elimination method using a virtual mark according to an exemplary embodiment of the present disclosure.

FIG. 3 illustrates a flowchart of a vehicle body flaw elimination method using a virtual mark according to an exemplary embodiment of the present disclosure.

Referring to FIG. 3, vehicle information is inputted to the vehicle body flaw elimination system at step S300.

The vehicle information may be automatically detect by the robotic visioner 112 to be transmitted to the controller 150, or may be previously selected by a predetermined program or algorithm.

Alternatively, the vehicle information may be inputted by the worker 200.

When the vehicle body 100 reaches a predetermined position along the conveyor 220 at step S305, the robot 110 moves the robotic visioner 112 to detect the flaw formed on an actual surface of the vehicle body 100, and it transmits flaw data including the position and the characteristic of the detected flaw to the controller 150 at step S310.

The controller 150 selects the 3D model based on the transmitted flaw data and the inputted vehicle information, and marks the position and the characteristic of the flaw on the 3D model with the virtual marker at step S315.

The position of the worker 200 is detected at step S320, and the position of the worker is detected through the position of the wearable device 130 worn by the worker 200.

A position of the 3D model viewed by the worker is changed based on the detected position of the worker, and information associated with the changed position of the 3D model and the virtual marker formed on the 3D model is transmitted to the wearable device 130, at step S325. Thus, the worker 200 may view the flaw of the actual vehicle body at their own position.

The fixed beacon 122a detects the position of the moving beacon 122b mounted on the work tool 210, and transmits the position information of the work tool 210 corresponding to the detected moving beacon to the controller 150 at step S330. The controller 150 may detect the position of the work tool 210 according to the positions of the fixed beacon 122a and the moving beacon 122b.

The controller 150 may determine a work state according to the position of the work tool 210 at step S335.

For example, when the work tool 210 is adjacent to the virtual marker, the controller may determine that repair is being undertaken.

A camera mounted on the wearable device 130 may detect the gesture of the worker at step S340.

The camera may transmit data corresponding to the detected gesture to the controller 150, and the controller 150 may determine whether the flaw elimination work is completed based on the data transmitted from the camera of the wearable device 130 at step S345.

When the controller 150 determines that the flaw elimination work is completed, it eliminates the virtual marker corresponding to the flaw that is completely eliminated, and transmits data of the 3D model including this content to the wearable device 130 such that the transmitted 3D model may be displayed on a screen of the wearable device at step S350.

By repeating the above-mentioned processes, flaws are sequentially removed, and corresponding virtual markers are also deleted at step S355. Then, when all the virtual markers are deleted, the flaw elimination work is completed at step S360.

In an exemplary embodiment of the present disclosure, when the worker moves, a snap view with a 3D drawing and a marker may be displayed on the wearable device 130 worn by the worker, for example, on a screen of a smart glass.

Figure 4:
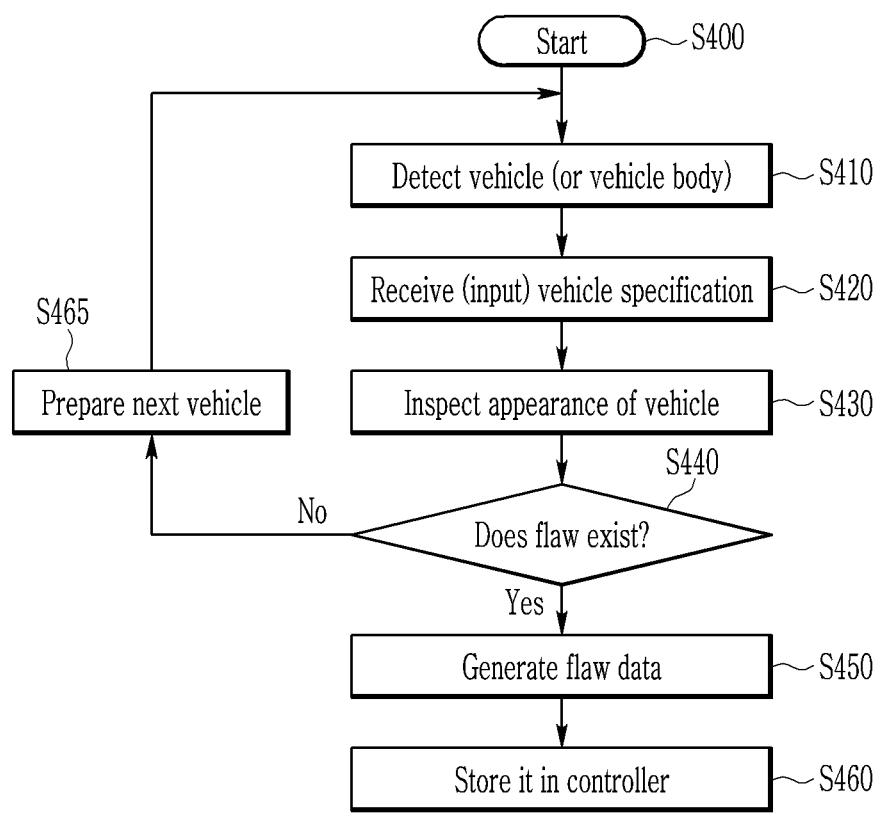
FIG. 4 illustrates a flowchart of a method of automatically detecting a flaw according to an exemplary embodiment of the present disclosure.

FIG. 4 illustrates a flowchart of a method of automatically detecting a flaw according to an exemplary embodiment of the present disclosure.

Referring to FIG. 4, the method of automatically detecting the flaw starts at step S400, the controller 150 detects a vehicle (or vehicle body) moving by the conveyor 220 at step S410, and specification of the detected vehicle body is inputted at step S420.

The robotic visioner 112 checks the appearance of the vehicle body 100 through an operation of the robot 110 at step S430, and the robotic visioner 112 determines whether a flaw exists on the vehicle body at step S440.

When it is determined that the flaw does not exist, the controller 150 prepares a next vehicle body at step S465.

When it is determined that the flaw exists, the robotic visioner 112 generates flaw data including the position and the characteristic of the flaw at step S450, and the flaw data is stored in the controller 150 at step S460.

Figure 5:
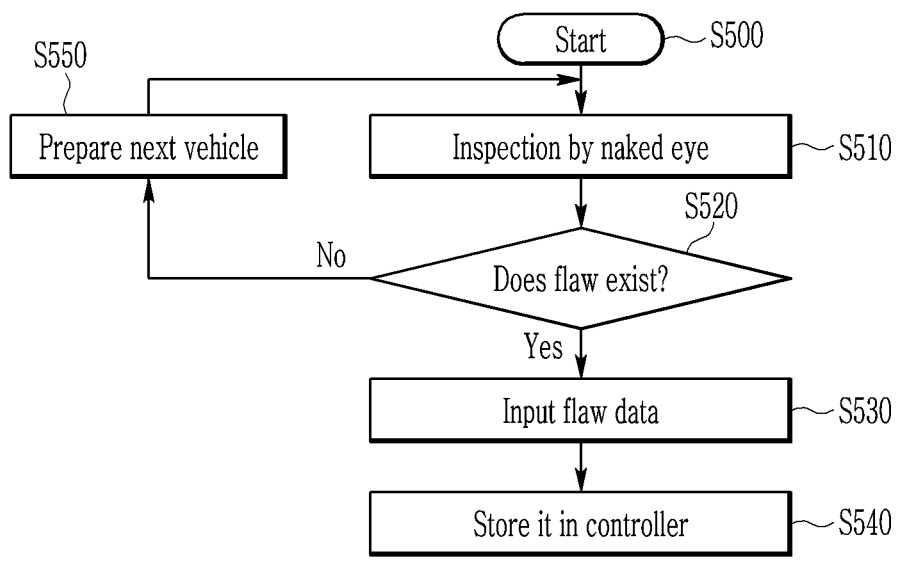
FIG. 5 illustrates a flowchart of a method of manually detecting a flaw according to an exemplary embodiment of the present disclosure.

FIG. 5 illustrates a flowchart of a method of manually detecting a flaw according to an exemplary embodiment of the present disclosure.

Referring to FIG. 5, an inspection by the naked eye of the worker is performed at step S510.

When it is determined that a flaw exists at step S520, flaw data is inputted to a portable input device at step S530, and the inputted flaw data is stored in a separate storage of the controller 150 at step S540.

When it is determined that a flaw does not exist at step S520, a process of preparing a next vehicle body is performed at step S550. Since this process is well known in the art, a detailed description thereof will be omitted.

Figure 6:
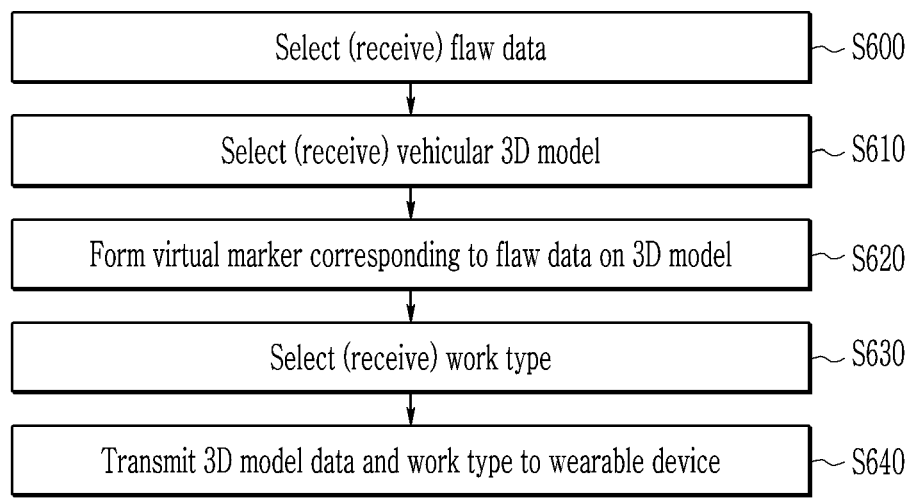
FIG. 6 illustrates a flowchart of a method according to an exemplary embodiment of the present disclosure for forming a virtual mark and transmitting the virtual mark to a wearable device.

FIG. 6 illustrates a flowchart of a method according to an exemplary embodiment of the present disclosure for forming a virtual mark and transmitting the virtual mark to a wearable device 130.

Referring to FIG. 6, the controller 150 receives or selects the flaw data at step S600, and it receives or selects the 3D model of the vehicle body at step S610.

The controller 150 generates the virtual marker representing the position and the characteristic of the flaw on the 3D model at step S620, and the controller 150 selects a kind of work according to the characteristic of the flaw at step S630.

Then, the controller 150 transmits 3D model data including the position and the characteristic of the flaw and the method of the work to the wearable device 130 such that the worker 200 may easily identify them at step S640.

Figure 7:
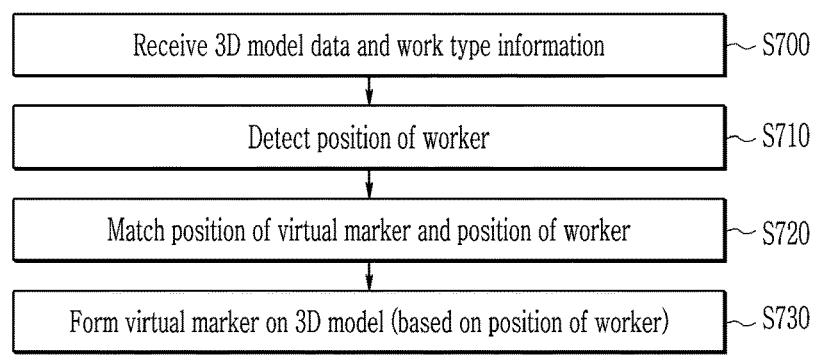
FIG. 7 illustrates a flowchart of a method of forming a virtual mark based on a position of a worker according to an exemplary embodiment of the present disclosure.

FIG. 7 illustrates a flowchart of a method of forming a virtual mark based on a position of a worker according to an exemplary embodiment of the present disclosure.

Referring to FIG. 7, the controller 150 selects or receives the 3D model data including the virtual marker and the work type information at step S700.

The controller 150 detects the position of the wearable device 130 to recognize the position of the worker 200 at step S710, the controller 150 matches the position of the worker 200 and the 3D model data including the virtual marker at step S720, and the controller 150 generates 3D model data in which the virtual marker is formed based on the position of the worker at step S730.

Figure 8:
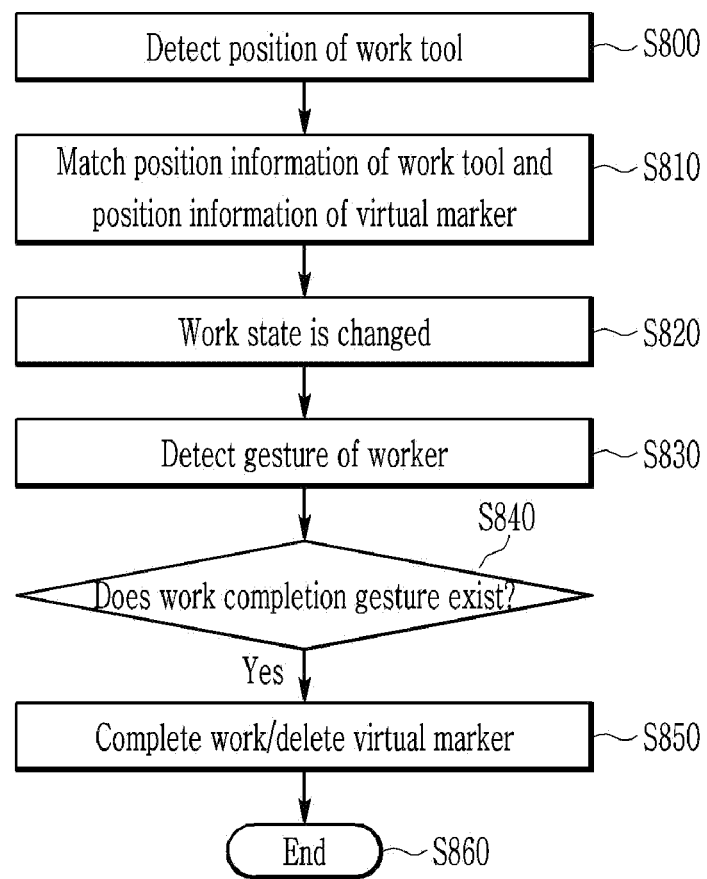
FIG. 8 illustrates a flowchart of a method of eliminating a flaw using a virtual mark according to an exemplary embodiment of the present disclosure.

FIG. 8 illustrates a flowchart of a method of eliminating a flaw using a virtual mark according to an exemplary embodiment of the present disclosure.

Referring to FIG. 8, the controller 150 detects the position of the work tool 210 at step S800, and the controller 150 matches the position information of the work tool 210 and the position information of the virtual marker at step S810.

The controller 150 determines whether the repair is being undertaken according to the position information of the work tool 210 and the position information of the virtual marker at step S820. For example, the controller 150 may determine that the repair is being undertaken when the work tool 210 is adjacent to the virtual marker for a predetermined period. The gesture of the worker is detected through the camera of the wearable device 130 at step S830.

It is determined whether the gesture of the worker indicates the completion of the work at step S840.

When it is determined that the gesture of the worker does not indicate the completion of the work, step S820 is performed, and when it is determined that the gesture of the worker does indicate the completion of the work, it is determined that the flaw elimination work is completed and the virtual marker is deleted at step S850.

Then, when all the flaw elimination work is completed, the control is terminated at step S860.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle body flaw elimination method using a virtual mark, comprising:
   detecting, by a robotic visioner, a flaw formed on a vehicle body surface and outputting corresponding flaw data;
   forming, by a controller, a virtual marker corresponding to the flaw data on a 3D model corresponding to the vehicle body;
   transmitting, by the controller, data of the 3D model on which the virtual marker is formed to a wearable device; and
   detecting, by the controller, a position of the vehicle body and a position of the wearable device to identify the position of the vehicle body and a position of a worker wearing the wearable device, and modifying the 3D model transmitted to the wearable device in a direction in which the worker views the vehicle body.

2. The vehicle body flaw elimination method using the virtual mark of claim 1, wherein
   the flaw data includes position information detected by the robotic visioner and a flaw characteristic.

3. The vehicle body flaw elimination method using the virtual mark of claim 1, further comprising:
   detecting, by the controller, a position of a work tool configured to eliminate the flaw; and
   selecting, by the controller, the flaw to be repaired according to the position of the wearable device and the position of the work tool.

4. The vehicle body flaw elimination method using the virtual mark of claim 3, further comprising:
 detecting, by the controller, a gesture of the worker; and
 determining, by the controller, whether the flaw is eliminated based on the detected gesture.

5. The vehicle body flaw elimination method using the virtual mark of claim 4, further comprising
 eliminating, by the controller, the virtual marker from the data of the 3D model when the flaw is determined to be eliminated.

6. The vehicle body flaw elimination method using the virtual mark of claim 3, wherein
 each position of the wearable device, the vehicle body, or the work tool is detected through a relative position between a reference beacon arranged on a predetermined position in a work space and a moving beacon disposed on the wearable device, the vehicle body, or the work tool.

7. The vehicle body flaw elimination method using the virtual mark of claim 1, further comprising:
 detecting or receiving, by the controller, specification information of the vehicle body; and
 selecting, by the controller, the 3D model according to the specification information.

8. The vehicle body flaw elimination method using the virtual mark of claim 1, wherein
 the wearable device is a smart glass.

9. A vehicle body flaw elimination method using a virtual mark, comprising:
 inputting, through an input device, flaw data;
 forming, by a controller, a virtual marker corresponding to the flaw data on a 3D model corresponding to a vehicle body;
 transmitting, by the controller, data of the 3D model on which the virtual marker is formed to a wearable device; and
 detecting, by the controller, a position of the vehicle body and a position of the wearable device to identify the position of the vehicle body and a position of a worker wearing the wearable device, and modifying the 3D model transmitted to the wearable device in a direction in which the worker views the vehicle body.

10. The vehicle body flaw elimination method using the virtual mark of claim 9, wherein
 the flaw data includes a position and type of the flaw.

11. The vehicle body flaw elimination method using the virtual mark of claim 10, further comprising
 selecting, by the controller, a working method according to the type of the flaw, and transmitting the working method to the wearable device.

12. The vehicle body flaw elimination method using the virtual mark of claim 10, wherein
 the wearable device is a smart glass.

13. A vehicle body flaw elimination system using a virtual mark, comprising:
 a robotic visioner configured to detect a flaw formed on an outer surface of a vehicle;
 a position detector configured to detect a position of a wearable device used by a worker based on the vehicle; and
 a controller configured to form a virtual marker at a position corresponding to the flaw detected by the robotic visioner among 3D data corresponding to the vehicle and to transmit the virtual marker combined with the 3D data corresponding to the position of the wearable device based on a vehicle body of the vehicle to the wearable device.

14. The vehicle body flaw elimination system using the virtual mark of claim 13, wherein
 the position detector detects a position of a work tool eliminating the virtual marker, and
 the controller identifies the position of the worker through the position of the wearable device, and selects a work tool to eliminate the virtual marker corresponding to the position of the worker to display it on a screen of the wearable device.

15. The vehicle body flaw elimination system using the virtual mark of claim 13, wherein:
 the wearable device includes a camera configured to detect a gesture of the worker; and
 the controller determines whether to eliminate the virtual marker through the gesture recognized by the camera, and deletes the corresponding virtual marker from the 3D data when it is determined to eliminate the virtual marker.

16. The vehicle body flaw elimination system using the virtual mark of claim 13, wherein
 the wearable device is a smart glass.

17. The vehicle body flaw elimination system using the virtual mark of claim 14, wherein
 the position detector includes:
 fixed beacons arranged at predetermined intervals on an upper portion of the vehicle; and
 a moving beacon disposed on the vehicle, the wearable device, or the work tool, wherein a corresponding position is detected according to a relative position between a fixed beacon and the moving beacon.

* * * * *